(12) United States Patent
Shokrollahi et al.

(10) Patent No.: US 10,333,741 B2
(45) Date of Patent: Jun. 25, 2019

(54) VECTOR SIGNALING CODES FOR DENSELY-ROUTED WIRE GROUPS

(71) Applicant: Kandou Labs, S.A., Lausanne (CH)

(72) Inventors: Amin Shokrollahi, Preverenges (CH);
Ali Hormati, Ecublens Vaud (CH);
Armin Tajalli, Chavannes près Renens (CH)

(73) Assignee: KANDOU LABS, S.A., Lausanne (CH)

( * ) Notice: Subject to any disclaimer, the term of this patent is extended or adjusted under 35 U.S.C. 154(b) by 100 days.

(21) Appl. No.: 15/499,866

(22) Filed: Apr. 27, 2017

(65) Prior Publication Data
US 2017/0317855 A1     Nov. 2, 2017

Related U.S. Application Data (60) Provisional application No. 62/328,721, filed on Apr. 28, 2016.

(51) Int. Cl.
| | | |
|---|---|---|
| *H04L 25/49* | (2006.01) | |
| *H04L 25/02* | (2006.01) | |
| *H04L 25/03* | (2006.01) | |

(52) U.S. Cl.
CPC .... *H04L 25/0272* (2013.01); *H04L 25/03343* (2013.01)

(58) Field of Classification Search
CPC .............................. H04L 25/49–25/497; H04L 25/0272–25/0276; H04L 25/0284; H04L 25/0292–25/0298
USPC ................. 341/50, 58, 68–70; 375/242–254, 375/259–285, 286–288
See application file for complete search history.

(56) References Cited

U.S. PATENT DOCUMENTS

| | | | |
|---|---|---|---|
| 668,687 | A | 2/1901 | Mayer |
| 780,883 | A | 1/1905 | Hinchman |
| 3,196,351 | A | 7/1965 | Slepian |
| 3,636,463 | A | 1/1972 | Ongkiehong |

(Continued)

FOREIGN PATENT DOCUMENTS

| | | |
|---|---|---|
| CN | 1864346 | 11/2006 |
| CN | 101478286 | 7/2009 |

(Continued)

OTHER PUBLICATIONS

Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.

(Continued)

*Primary Examiner* — James M Perez
(74) *Attorney, Agent, or Firm* — Invention Mine LLC (57) ABSTRACT

Methods and systems are described for receiving signal elements corresponding to a first group of symbols of a vector signaling codeword over a first densely-routed wire group of a multi-wire bus at a first set of multi-input comparators (MICs), receiving signal elements corresponding to a second group of symbols of the vector signaling codeword over a second densely-routed wire group of the multi-wire bus at a second set of MICs, and receiving signal elements corresponding to the first and the second groups of symbols of the vector signaling codeword at a global MIC.

20 Claims, 5 Drawing Sheets

(56) References Cited

U.S. PATENT DOCUMENTS

| | | |
|---|---|---|
| 3,939,468 A | 2/1976 | Mastin |
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |
| 4,486,739 A | 12/1984 | Franaszek |
| 4,499,550 A | 2/1985 | Ray, III |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,017,924 A | 5/1991 | Guiberteau |
| 5,053,974 A | 10/1991 | Penz |
| 5,166,956 A | 11/1992 | Baltus |
| 5,168,509 A | 12/1992 | Nakamura |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,334,956 A | 8/1994 | Leding et al. |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,510,736 A | 4/1996 | Van De Plassche |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,748,948 A | 5/1998 | Yu |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,982,954 A | 11/1999 | Delen |
| 5,995,016 A | 11/1999 | Perino |
| 5,999,016 A | 12/1999 | McClintock |
| 6,005,895 A | 12/1999 | Perino |
| 6,084,883 A | 7/2000 | Norrell |
| 6,119,263 A | 9/2000 | Mowbray |
| 6,154,498 A * | 11/2000 | Dabral ............... G06F 13/4072 327/141 |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 * | 8/2001 | Nordyke ............... H04B 3/00 327/63 |
| 6,316,987 B1 | 11/2001 | Dally |
| 6,317,465 B1 * | 11/2001 | Akamatsu ........... H04L 25/0272 375/257 |
| 6,346,907 B1 | 2/2002 | Dacy |
| 6,359,931 B1 * | 3/2002 | Perino ....................... H04L 5/20 375/257 |
| 6,378,073 B1 | 4/2002 | Davis |
| 6,384,758 B1 | 5/2002 | Michalski |
| 6,396,329 B1 * | 5/2002 | Zerbe ....................... G11C 7/02 327/319 |
| 6,398,359 B1 | 6/2002 | Silverbrook |
| 6,400,302 B1 * | 6/2002 | Amazeen ............... H03M 1/68 341/150 |
| 6,404,820 B1 | 6/2002 | Postol |
| 6,417,737 B1 | 7/2002 | Moloudi |
| 6,433,800 B1 | 8/2002 | Holtz |
| 6,452,420 B1 * | 9/2002 | Wong ....................... H04L 5/20 326/30 |
| 6,473,877 B1 | 10/2002 | Debendra Das |
| 6,483,828 B1 | 11/2002 | Balachandran |
| 6,504,875 B2 | 1/2003 | Perino |
| 6,509,773 B2 | 1/2003 | Buchwald |
| 6,522,699 B1 | 2/2003 | Anderson |
| 6,556,628 B1 * | 4/2003 | Poulton ............... H04L 25/0266 375/257 |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,664,355 B2 | 12/2003 | Kim |
| 6,686,879 B2 | 2/2004 | Shattil |
| 6,690,739 B1 | 2/2004 | Mui |
| 6,766,342 B2 | 7/2004 | Kechriotis |
| 6,772,351 B1 | 8/2004 | Werner |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,991,038 B2 | 1/2006 | Guesnon |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,075,996 B2 | 7/2006 | Simon |
| 7,080,288 B2 | 7/2006 | Ferraiolo |
| 7,082,557 B2 | 7/2006 | Schauer |
| 7,085,153 B2 | 8/2006 | Ferrant |
| 7,085,336 B2 | 8/2006 | Lee |
| 7,123,660 B2 * | 10/2006 | Haq ....................... G11C 7/1078 375/257 |
| 7,127,003 B2 * | 10/2006 | Rajan ................... G06F 13/4072 375/286 |
| 7,130,944 B2 | 10/2006 | Perino |
| 7,142,612 B2 | 11/2006 | Horowitz |
| 7,142,865 B2 | 11/2006 | Tsai |
| 7,145,411 B1 * | 12/2006 | Blair ....................... H01P 3/006 333/5 |
| 7,164,631 B2 | 1/2007 | Tateishi |
| 7,167,019 B2 | 1/2007 | Broyde |
| 7,176,823 B2 | 2/2007 | Zabroda |
| 7,180,949 B2 | 2/2007 | Kleveland |
| 7,184,483 B2 | 2/2007 | Rajan |
| 7,188,199 B2 * | 3/2007 | Leung ................... H03M 1/1057 341/118 |
| 7,199,728 B2 | 4/2007 | Dally |
| 7,231,558 B2 | 6/2007 | Gentieu |
| 7,269,130 B2 | 9/2007 | Pitio |
| 7,269,212 B1 | 9/2007 | Chau |
| 7,335,976 B2 | 2/2008 | Chen |
| 7,336,112 B1 | 2/2008 | Sha |
| 7,336,139 B2 * | 2/2008 | Blair ....................... H01P 3/006 333/1 |
| 7,339,990 B2 | 3/2008 | Hidaka |
| 7,346,819 B2 | 3/2008 | Bansal |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 * | 4/2008 | Chiarulli ................ H03M 5/00 341/143 |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |

(56) References Cited

U.S. PATENT DOCUMENTS

| | | | | |
|---|---|---|---|---|
| 7,389,333 | B2 | 6/2008 | Moore | |
| 7,397,302 | B2 | 7/2008 | Bardsley | |
| 7,400,276 | B1 | 7/2008 | Sotiriadis | |
| 7,428,273 | B2 | 9/2008 | Foster | |
| 7,456,778 | B2 | 11/2008 | Werner | |
| 7,462,956 | B2 | 12/2008 | Lan | |
| 7,496,162 | B2 | 2/2009 | Srebranig | |
| 7,570,704 | B2 | 4/2009 | Nagarajan | |
| 7,535,957 | B2 | 5/2009 | Ozawa | |
| 7,539,532 | B2 | 5/2009 | Tran | |
| 7,599,390 | B2 | 10/2009 | Pamarti | |
| 7,613,234 | B2 | 11/2009 | Raghavan | |
| 7,616,075 | B2 | 11/2009 | Kushiyama | |
| 7,620,116 | B2 | 11/2009 | Bessios | |
| 7,626,442 | B2* | 12/2009 | Zerbe | H04L 25/03006 327/336 |
| 7,633,850 | B2 | 12/2009 | Nagarajan | |
| 7,639,596 | B2 | 12/2009 | Cioffi | |
| 7,643,588 | B2 | 1/2010 | Visalli | |
| 7,650,525 | B1 | 1/2010 | Chang | |
| 7,656,321 | B2 | 2/2010 | Wang | |
| 7,688,929 | B2* | 3/2010 | Co | H03C 3/0966 327/147 |
| 7,694,204 | B2 | 4/2010 | Schmidt | |
| 7,697,915 | B2 | 4/2010 | Behzad | |
| 7,698,088 | B2 | 4/2010 | Sul | |
| 7,706,456 | B2 | 4/2010 | Laroia | |
| 7,706,524 | B2 | 4/2010 | Zerbe | |
| 7,746,764 | B2 | 6/2010 | Rawlins | |
| 7,768,312 | B2 | 8/2010 | Hirose | |
| 7,787,572 | B2 | 8/2010 | Scharf | |
| 7,804,361 | B2 | 9/2010 | Lim | |
| 7,808,456 | B2 | 10/2010 | Chen | |
| 7,808,883 | B2 | 10/2010 | Green | |
| 7,826,551 | B2* | 11/2010 | Lee | H04L 25/0272 327/64 |
| 7,841,909 | B2 | 11/2010 | Murray | |
| 7,859,356 | B2* | 12/2010 | Pandey | H01P 3/088 333/1 |
| 7,868,790 | B2* | 1/2011 | Bae | H03K 5/2481 341/55 |
| 7,869,497 | B2 | 1/2011 | Benvenuto | |
| 7,869,546 | B2 | 1/2011 | Tsai | |
| 7,882,413 | B2 | 2/2011 | Chen | |
| 7,899,653 | B2 | 3/2011 | Hollis | |
| 7,907,676 | B2 | 3/2011 | Stojanovic | |
| 7,933,770 | B2 | 4/2011 | Kruger | |
| 7,957,472 | B2* | 6/2011 | Wu | H04L 25/0264 375/244 |
| 8,000,664 | B2 | 8/2011 | Khorram | |
| 8,030,999 | B2 | 10/2011 | Chatterjee | |
| 8,036,300 | B2 | 10/2011 | Evans | |
| 8,050,332 | B2 | 11/2011 | Chung | |
| 8,055,095 | B2 | 11/2011 | Palotai | |
| 8,064,535 | B2 | 11/2011 | Wiley | |
| 8,085,172 | B2 | 12/2011 | Li | |
| 8,091,006 | B2 | 1/2012 | Prasad | |
| 8,106,806 | B2 | 1/2012 | Toyomura | |
| 8,149,906 | B2 | 4/2012 | Saito | |
| 8,159,375 | B2 | 4/2012 | Abbasfar | |
| 8,159,376 | B2 | 4/2012 | Abbasfar | |
| 8,180,931 | B2 | 5/2012 | Lee | |
| 8,185,807 | B2 | 5/2012 | Oh | |
| 8,199,849 | B2 | 6/2012 | Oh | |
| 8,199,863 | B2 | 6/2012 | Chen | |
| 8,218,670 | B2 | 7/2012 | AbouRjeily | |
| 8,233,544 | B2 | 7/2012 | Bao | |
| 8,245,094 | B2 | 8/2012 | Jiang | |
| 8,253,454 | B2 | 8/2012 | Lin | |
| 8,274,311 | B2* | 9/2012 | Liu | G06F 13/4213 326/86 |
| 8,279,094 | B2 | 10/2012 | Abbasfar | |
| 8,279,745 | B2 | 10/2012 | Dent | |
| 8,279,976 | B2* | 10/2012 | Lin | H04L 5/20 375/222 |
| 8,284,848 | B2* | 10/2012 | Nam | H04B 3/00 375/244 |
| 8,289,914 | B2 | 10/2012 | Li | |
| 8,295,250 | B2 | 10/2012 | Gorokhov | |
| 8,295,336 | B2 | 10/2012 | Lutz | |
| 8,305,247 | B2 | 11/2012 | Pun | |
| 8,310,389 | B1 | 11/2012 | Chui | |
| 8,341,492 | B2 | 12/2012 | Shen | |
| 8,359,445 | B2 | 1/2013 | Ware | |
| 8,365,035 | B2 | 1/2013 | Hara | |
| 8,406,315 | B2 | 3/2013 | Tsai | |
| 8,406,316 | B2 | 3/2013 | Sugita | |
| 8,429,492 | B2 | 4/2013 | Yoon | |
| 8,429,495 | B2 | 4/2013 | Przybylski | |
| 8,437,440 | B1 | 5/2013 | Zhang | |
| 8,442,099 | B1 | 5/2013 | Sederat | |
| 8,442,210 | B2 | 5/2013 | Zerbe | |
| 8,443,223 | B2 | 5/2013 | Abbasfar | |
| 8,451,913 | B2 | 5/2013 | Oh | |
| 8,462,891 | B2* | 6/2013 | Kizer | H03M 13/47 341/143 |
| 8,472,513 | B2 | 6/2013 | Malipatil | |
| 8,620,166 | B2 | 6/2013 | Dong | |
| 8,498,344 | B2 | 7/2013 | Wilson | |
| 8,498,368 | B1 | 7/2013 | Husted | |
| 8,520,348 | B2 | 8/2013 | Dong | |
| 8,520,493 | B2 | 8/2013 | Goulahsen | |
| 8,539,318 | B2 | 9/2013 | Cronie | |
| 8,547,272 | B2 | 10/2013 | Nestler | |
| 8,577,284 | B2 | 11/2013 | Seo | |
| 8,578,246 | B2 | 11/2013 | Mittelholzer | |
| 8,588,254 | B2 | 11/2013 | Diab | |
| 8,588,280 | B2* | 11/2013 | Oh | G06F 13/4243 375/219 |
| 8,593,305 | B1 | 11/2013 | Tajalli | |
| 8,602,643 | B2 | 12/2013 | Gardiner | |
| 8,604,879 | B2 | 12/2013 | Mourant | |
| 8,638,241 | B2 | 1/2014 | Sudhakaran | |
| 8,643,437 | B2 | 2/2014 | Chiu | |
| 8,649,445 | B2 | 2/2014 | Cronie | |
| 8,649,460 | B2* | 2/2014 | Ware | H03M 5/16 375/268 |
| 8,649,556 | B2 | 2/2014 | Wedge | |
| 8,649,840 | B2 | 2/2014 | Sheppard, Jr. | |
| 8,674,861 | B2 | 3/2014 | Matsuno | |
| 8,687,968 | B2 | 4/2014 | Nosaka | |
| 8,711,919 | B2 | 4/2014 | Kumar | |
| 8,718,184 | B1 | 5/2014 | Cronie | |
| 8,755,426 | B1 | 6/2014 | Cronie | |
| 8,773,964 | B2 | 7/2014 | Hsueh | |
| 8,780,687 | B2 | 7/2014 | Clausen | |
| 8,782,578 | B2 | 7/2014 | Tell | |
| 8,791,735 | B1 | 7/2014 | Shibasaki | |
| 8,831,440 | B2 | 9/2014 | Yu | |
| 8,841,936 | B2 | 9/2014 | Nakamura | |
| 8,879,660 | B1 | 11/2014 | Peng | |
| 8,897,134 | B2 | 11/2014 | Kern | |
| 8,898,504 | B2 | 11/2014 | Baumgartner | |
| 8,938,171 | B2 | 1/2015 | Tang | |
| 8,949,693 | B2 | 2/2015 | Ordentlich | |
| 8,951,072 | B2 | 2/2015 | Hashim | |
| 8,975,948 | B2 | 3/2015 | GonzalezDiaz | |
| 8,989,317 | B1 | 3/2015 | Holden | |
| 8,996,740 | B2* | 3/2015 | Wiley | H04L 25/02 710/8 |
| 9,015,566 | B2 | 4/2015 | Cronie | |
| 9,020,049 | B2 | 4/2015 | Schwager | |
| 9,036,764 | B1 | 5/2015 | Hossain | |
| 9,059,816 | B1 | 6/2015 | Simpson | |
| 9,069,995 | B1 | 6/2015 | Cronie | |
| 9,077,386 | B1 | 7/2015 | Holden | |
| 9,083,576 | B1 | 7/2015 | Hormati | |
| 9,093,791 | B2 | 7/2015 | Liang | |
| 9,100,232 | B1* | 8/2015 | Hormati | H04L 25/03343 |
| 9,106,465 | B2 | 8/2015 | Walter | |
| 9,124,557 | B2 | 9/2015 | Fox | |
| 9,148,087 | B1 | 9/2015 | Tajalli | |

(56) References Cited

U.S. PATENT DOCUMENTS

| | | | |
|---|---|---|---|
| 9,152,495 B2 | 10/2015 | Losh | |
| 9,165,615 B2 | 10/2015 | Amirkhany | |
| 9,172,412 B2 | 10/2015 | Kim | |
| 9,178,503 B2 | 11/2015 | Hsieh | |
| 9,183,085 B1 | 11/2015 | Northcott | |
| 9,197,470 B2 | 11/2015 | Okunev | |
| 9,231,790 B2* | 1/2016 | Wiley | H04L 5/20 |
| 9,246,713 B2* | 1/2016 | Shokrollahi | H04L 17/18 |
| 9,281,785 B2 | 3/2016 | Sjoland | |
| 9,288,082 B1 | 3/2016 | Ulrich | |
| 9,288,089 B2 | 3/2016 | Cronie | |
| 9,292,716 B2 | 3/2016 | Winoto | |
| 9,300,503 B1* | 3/2016 | Holden | H04L 25/4925 |
| 9,306,621 B2 | 4/2016 | Zhang | |
| 9,319,218 B2* | 4/2016 | Pandey | H04B 3/00 |
| 9,331,962 B2 | 5/2016 | Lida | |
| 9,362,974 B2 | 6/2016 | Fox | |
| 9,363,114 B2* | 6/2016 | Shokrollahi | H04L 25/03006 |
| 9,374,250 B1 | 6/2016 | Musah | |
| 9,401,828 B2 | 7/2016 | Cronie | |
| 9,432,082 B2* | 8/2016 | Ulrich | H04B 3/50 |
| 9,432,298 B1 | 8/2016 | Smith | |
| 9,444,654 B2 | 9/2016 | Hormati | |
| 9,455,744 B2 | 9/2016 | George | |
| 9,455,765 B2 | 9/2016 | Schumacher | |
| 9,461,862 B2* | 10/2016 | Holden | H04L 27/2637 |
| 9,479,369 B1 | 10/2016 | Shokrollahi | |
| 9,509,437 B2 | 11/2016 | Shokrollahi | |
| 9,520,883 B2 | 12/2016 | Shibasaki | |
| 9,521,058 B2* | 12/2016 | Pandey | H04B 3/00 |
| 9,537,644 B2* | 1/2017 | Jones | H04L 5/14 |
| 9,544,015 B2 | 1/2017 | Ulrich | |
| 9,565,036 B2* | 2/2017 | Zerbe | H04L 25/0264 |
| 9,596,109 B2* | 3/2017 | Fox | H04L 25/085 |
| 9,634,797 B2 | 4/2017 | Benammar | |
| 9,667,379 B2 | 5/2017 | Cronie | |
| 9,686,106 B2* | 6/2017 | Shokrollahi | H04L 25/03006 |
| 9,825,723 B2* | 11/2017 | Holden | H04L 25/4925 |
| 9,852,806 B2* | 12/2017 | Stauffer | G11C 5/04 |
| 9,906,358 B1* | 2/2018 | Tajalli | H03L 7/0807 |
| 9,917,711 B2 | 3/2018 | Ulrich | |
| 9,985,745 B2* | 5/2018 | Shokrollahi | H03M 5/02 |
| 10,003,315 B2* | 6/2018 | Tajalli | H03F 3/45183 |
| 10,044,452 B2* | 8/2018 | Holden | H04L 25/4925 |
| 10,055,372 B2* | 8/2018 | Shokrollahi | G06F 13/362 |
| 2001/0006538 A1 | 7/2001 | Simon | |
| 2001/0055344 A1 | 12/2001 | Lee | |
| 2002/0034191 A1 | 3/2002 | Shattil | |
| 2002/0044316 A1 | 4/2002 | Myers | |
| 2002/0057592 A1 | 5/2002 | Robb | |
| 2002/0152340 A1* | 10/2002 | Dreps | G06F 13/4217 710/100 |
| 2002/0154633 A1 | 10/2002 | Shin | |
| 2002/0163881 A1 | 11/2002 | Dhong | |
| 2002/0167339 A1 | 11/2002 | Chang | |
| 2002/0174373 A1 | 11/2002 | Chang | |
| 2002/0181607 A1 | 12/2002 | Izumi | |
| 2003/0016763 A1 | 1/2003 | Doi | |
| 2003/0016770 A1 | 1/2003 | Trans | |
| 2003/0046618 A1 | 3/2003 | Collins | |
| 2003/0085763 A1 | 5/2003 | Schrodinger | |
| 2003/0117184 A1* | 6/2003 | Fecteau | H03K 5/135 327/94 |
| 2003/0146783 A1 | 8/2003 | Bandy | |
| 2003/0174023 A1 | 9/2003 | Miyasita | |
| 2003/0185310 A1 | 10/2003 | Ketchum | |
| 2003/0218558 A1 | 11/2003 | Mulder | |
| 2004/0027185 A1 | 2/2004 | Fiedler | |
| 2004/0057525 A1* | 3/2004 | Rajan | G06F 13/4072 375/257 |
| 2004/0146117 A1 | 7/2004 | Subramaniam | |
| 2004/0155802 A1 | 8/2004 | Lamy | |
| 2004/0161019 A1 | 8/2004 | Raghavan | |
| 2004/0169529 A1 | 9/2004 | Afghahi | |
| 2004/0170231 A1 | 9/2004 | Bessios | |
| 2004/0239374 A1* | 12/2004 | Hori | H03K 5/003 327/65 |
| 2005/0063493 A1 | 3/2005 | Foster | |
| 2005/0134380 A1 | 6/2005 | Nairn | |
| 2005/0174841 A1 | 8/2005 | Ho | |
| 2005/0195000 A1 | 9/2005 | Parker | |
| 2005/0201491 A1 | 9/2005 | Wei | |
| 2005/0213686 A1 | 9/2005 | Love | |
| 2005/0220182 A1 | 10/2005 | Kuwata | |
| 2005/0270098 A1 | 12/2005 | Zhang | |
| 2006/0013331 A1* | 1/2006 | Choi | H04L 5/20 375/288 |
| 2006/0036668 A1 | 2/2006 | Jaussi | |
| 2006/0097786 A1 | 5/2006 | Su | |
| 2006/0103463 A1 | 5/2006 | Lee | |
| 2006/0120486 A1 | 6/2006 | Visalli | |
| 2006/0121801 A1* | 6/2006 | Pischl | H01F 19/08 439/894 |
| 2006/0126751 A1 | 6/2006 | Bessios | |
| 2006/0133538 A1 | 6/2006 | Stojanovic | |
| 2006/0140324 A1 | 6/2006 | Casper | |
| 2006/0159005 A1 | 7/2006 | Rawlins | |
| 2006/0232461 A1 | 10/2006 | Felder | |
| 2006/0233291 A1 | 10/2006 | Garlepp | |
| 2006/0291589 A1 | 12/2006 | Eliezer | |
| 2007/0001723 A1 | 1/2007 | Lin | |
| 2007/0002954 A1 | 1/2007 | Cornelius | |
| 2007/0009018 A1* | 1/2007 | Wang | H04L 25/0272 375/222 |
| 2007/0030796 A1 | 2/2007 | Green | |
| 2007/0071113 A1* | 3/2007 | Lee | H04L 25/0272 375/257 |
| 2007/0103338 A1 | 5/2007 | Teo | |
| 2007/0121716 A1 | 5/2007 | Nagarajan | |
| 2007/0164883 A1* | 7/2007 | Furtner | G06F 13/4295 341/126 |
| 2007/0182487 A1 | 8/2007 | Ozasa | |
| 2007/0201546 A1 | 8/2007 | Lee | |
| 2007/0201597 A1 | 8/2007 | He | |
| 2007/0204205 A1 | 8/2007 | Niu | |
| 2007/0263711 A1 | 11/2007 | Kramer | |
| 2007/0283210 A1 | 12/2007 | Prasad | |
| 2008/0007367 A1 | 1/2008 | Kim | |
| 2008/0012598 A1 | 1/2008 | Mayer | |
| 2008/0104374 A1 | 5/2008 | Mohamed | |
| 2008/0159448 A1 | 7/2008 | Anim-Appiah | |
| 2008/0192621 A1 | 8/2008 | Suehiro | |
| 2008/0317188 A1 | 12/2008 | Staszewski | |
| 2009/0046009 A1 | 2/2009 | Fujii | |
| 2009/0059782 A1 | 3/2009 | Cole | |
| 2009/0115523 A1 | 5/2009 | Akizuki | |
| 2009/0154604 A1 | 6/2009 | Lee | |
| 2009/0195281 A1 | 8/2009 | Tamura | |
| 2009/0262876 A1 | 10/2009 | Arima | |
| 2009/0316730 A1 | 12/2009 | Feng | |
| 2009/0323864 A1 | 12/2009 | Tired | |
| 2010/0046644 A1 | 2/2010 | Mazet | |
| 2010/0081451 A1 | 4/2010 | Mueck | |
| 2010/0148819 A1 | 6/2010 | Bae | |
| 2010/0180143 A1 | 7/2010 | Ware | |
| 2010/0215087 A1 | 8/2010 | Tsai | |
| 2010/0215112 A1 | 8/2010 | Tsai | |
| 2010/0215118 A1* | 8/2010 | Ware | H03M 5/16 375/295 |
| 2010/0235673 A1* | 9/2010 | Abbasfar | H03M 7/20 713/500 |
| 2010/0271107 A1 | 10/2010 | Tran | |
| 2010/0283894 A1 | 11/2010 | Horan | |
| 2010/0296556 A1 | 11/2010 | Rave | |
| 2010/0309964 A1 | 12/2010 | Oh | |
| 2011/0014865 A1 | 1/2011 | Seo | |
| 2011/0028089 A1 | 2/2011 | Komori | |
| 2011/0032977 A1 | 2/2011 | Hsiao | |
| 2011/0051854 A1* | 3/2011 | Kizer | H04L 25/4919 375/340 |
| 2011/0072330 A1 | 3/2011 | Kolze | |
| 2011/0074488 A1 | 3/2011 | Broyde | |
| 2011/0084737 A1 | 4/2011 | Oh | |

(56) References Cited

U.S. PATENT DOCUMENTS

| | | |
|---|---|---|
| 2011/0103508 A1 | 5/2011 | Mu |
| 2011/0127990 A1 | 6/2011 | Wilson |
| 2011/0156757 A1* | 6/2011 | Hayashi ............ G01R 31/31726 327/3 |
| 2011/0228864 A1 | 9/2011 | Aryanfar |
| 2011/0235501 A1 | 9/2011 | Goulahsen |
| 2011/0268225 A1 | 11/2011 | Cronie |
| 2011/0299555 A1 | 12/2011 | Cronie |
| 2011/0302478 A1 | 12/2011 | Cronie |
| 2011/0317559 A1 | 12/2011 | Kern |
| 2012/0082203 A1 | 4/2012 | Zerbe |
| 2012/0133438 A1 | 5/2012 | Tsuchi |
| 2012/0152901 A1 | 6/2012 | Nagorny |
| 2012/0161945 A1 | 6/2012 | Single |
| 2012/0213267 A1* | 8/2012 | Stojanovic ............ H04L 25/063 375/232 |
| 2012/0213299 A1 | 8/2012 | Cronie |
| 2012/0257683 A1 | 10/2012 | Schwager |
| 2013/0010892 A1 | 1/2013 | Cronie |
| 2013/0013870 A1 | 1/2013 | Cronie |
| 2013/0088274 A1 | 4/2013 | Gu |
| 2013/0106513 A1 | 5/2013 | Cyrusian |
| 2013/0114392 A1 | 5/2013 | Sun et al. |
| 2013/0114519 A1 | 5/2013 | Gaal |
| 2013/0114663 A1 | 5/2013 | Ding |
| 2013/0129019 A1 | 5/2013 | Sorrells |
| 2013/0147553 A1 | 6/2013 | Iwamoto |
| 2013/0188656 A1 | 7/2013 | Ferraiolo |
| 2013/0195155 A1 | 8/2013 | Pan |
| 2013/0202065 A1 | 8/2013 | Chmelar |
| 2013/0215954 A1 | 8/2013 | Beukema |
| 2013/0259113 A1 | 10/2013 | Kumar |
| 2013/0271194 A1 | 10/2013 | Pellerano |
| 2013/0307614 A1 | 11/2013 | Dai |
| 2013/0314142 A1 | 11/2013 | Tamura |
| 2013/0315501 A1 | 11/2013 | Atanassov |
| 2013/0346830 A1 | 12/2013 | Ordentlich |
| 2014/0159769 A1 | 6/2014 | Hong |
| 2014/0177645 A1 | 6/2014 | Cronie |
| 2014/0177696 A1 | 6/2014 | Hwang |
| 2014/0254642 A1* | 9/2014 | Fox ....................... H04L 25/028 375/219 |
| 2014/0266440 A1 | 9/2014 | Itagaki |
| 2014/0269130 A1 | 9/2014 | Maeng |
| 2014/0286381 A1 | 9/2014 | Shibasaki |
| 2014/0376668 A1* | 12/2014 | Shokrollahi ............ H04L 17/18 375/341 |
| 2015/0049798 A1 | 2/2015 | Hossein |
| 2015/0070201 A1 | 3/2015 | Dedic |
| 2015/0078479 A1 | 3/2015 | Whitby-Strevens |
| 2015/0117579 A1 | 4/2015 | Shibasaki |
| 2015/0146771 A1 | 5/2015 | Walter |
| 2015/0222458 A1 | 8/2015 | Hormati |
| 2015/0249559 A1* | 9/2015 | Shokrollahi ...... H04L 25/03006 375/257 |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0197747 A1 | 7/2016 | Ulrich |
| 2016/0211929 A1* | 7/2016 | Holden ............... H04L 25/4925 |
| 2016/0218894 A1* | 7/2016 | Fox ....................... H04L 25/085 |
| 2016/0261435 A1 | 9/2016 | Musah |
| 2016/0294586 A1* | 10/2016 | Shokrollahi ...... H04L 25/03006 |
| 2017/0279642 A1* | 9/2017 | Fox ........................... H04L 5/02 |
| 2017/0310456 A1 | 10/2017 | Tajalli |
| 2017/0317449 A1 | 11/2017 | Shokrollahi |
| 2017/0317855 A1* | 11/2017 | Shokrollahi ...... H04L 25/03343 |
| 2018/0076912 A1* | 3/2018 | Holden ............... H04L 25/4925 |
| 2018/0324008 A1* | 11/2018 | Shokrollahi ...... H04L 25/03006 |
| 2018/0351670 A1* | 12/2018 | Holden ............... H04L 25/4925 |

FOREIGN PATENT DOCUMENTS

| | | |
|---|---|---|
| EP | 1926267 | 5/2008 |
| EP | 2039221 | 2/2013 |
| JP | 2003163612 | 6/2003 |
| WO | 2005002162 | 1/2005 |
| WO | 2009084121 | 7/2009 |
| WO | 2010031824 | 3/2010 |
| WO | 2011119359 | 9/2011 |

OTHER PUBLICATIONS

Shibasaki, et al., "A 56-Gb/s Receiver Front-End with a CTLE and 1-Tap DFE in 20-nm CMOS", IEEE 2014 Symposium on VLSI Circuits Digest of Technical Papers, 2 pgs.

Hidaka, et al., "A 4-Channel 1.25-10.3 Gb/s Backplane Transceiver Macro With35 dB Equalizer and Sign-Based Zero-Forcing Adaptive Control", IEEE Journal of Solid-State Circuits, vol. 44 No. 12, Dec. 2009, pp. 3547-3559.

"Introduction to: Analog Computers and the DSPACE System," Course Material ECE 5230 Spring 2008, Utah State University, www.coursehero.com, 12 pages.

Abbasfar, A., "Generalized Differential Vector Signaling", IEEE International Conference on Communications, ICC 09, (Jun. 14, 2009), pp. 1-5.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

Clayton, P., "Introduction to Electromagnetic Compatibility", Wiley-Interscience, 2006.

Counts, L., et al., "One-Chip Slide Rule Works with Logs, Antilogs for Real-Time Processing," Analog Devices Computational Products 6, Reprinted from Electronic Design, May 2, 1985, 7 pages.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Design Brief 208 Using the Anadigm Multiplier CAM, Copyright 2002 Anadigm, 6 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Grahame, J., "Vintage Analog Computer Kits," posted on Aug. 25, 2006 in Classic Computing, 2 pages, http.//www.retrothing.com/2006/08/classic_analog_.html.

Healey, A., et al., "A Comparison of 25 Gbps NRZ & PAM-4 Modulation used in Legacy & Premium Backplane Channels", DesignCon 2012, 16 pages.

International Search Report and Written Opinion for PCT/EP2011/059279 dated Sep. 22, 2011.

International Search Report and Written Opinion for PCT/EP2011/074219 dated Jul. 4, 2012.

International Search Report and Written Opinion for PCT/EP2012/052767 dated May 11, 2012.

International Search Report and Written Opinion for PCT/US14/052986 dated Nov. 24, 2014.

International Search Report and Written Opinion from PCT/US2014/034220 dated Aug. 21, 2014.

International Search Report and Written Opinion of the International Searching Authority, dated Jul. 14, 2011 in International Patent Application S.N. PCT/EP2011/002170, 10 pages.

International Search Report and Written Opinion of the International Searching Authority, dated Nov. 5, 2012, in International Patent Application S.N. PCT/EP2012/052767, 7 pages.

(56) References Cited

OTHER PUBLICATIONS

International Search Report for PCT/US2014/053563, dated Nov. 11, 2014, 2 pages.

Jiang, A., et al., "Rank Modulation for Flash Memories", IEEE Transactions of Information Theory, Jun. 2006, vol. 55, No. 6, pp. 2659-2673.

Loh, M., et al., "A 3x9 Gb/s Shared, All-Digital CDR for High-Speed, High-Density I/O", Matthew Loh, IEEE Journal of Solid-State Circuits, Vo. 47, No. 3, Mar. 2012.

Notification of Transmittal of International Search Report and The Written Opinion of the International Searching Authority, for PCT/US2015/018363, dated Jun. 18, 2015, 13 pages.

Notification of Transmittal of the International Search Report and The Written Opinion of the International Searching Authority, or the Declaration for PCT/EP2013/002681, dated Feb. 25, 2014, 15 pages.

Notification of Transmittal of the International Search Report and The Written Opinion of the International Searching Authority, or the Declaration, dated Mar. 3, 2015, for PCT/US2014/066893, 9 pages.

Notification of Transmittal of the International Search Report and The Written Opinion of the International Searching Authority, or the Declaration, for PCT/US2014/015840, dated May 20, 2014. 11 pages.

Notification of Transmittal of the International Search Report and The Written Opinion of the International Searching Authority, or the Declaration, for PCT/US2014/043965, dated Oct. 22, 2014, 10 pages.

Notification of Transmittal of the International Search Report and the Written Opinion of the International Searching Authority, or the Declaration, for PCT/US2015/037466, dated Nov. 19, 2015.

Notification of Transmittal of the International Search Report and The Written Opinion of the International Searching Authority, or the Declaration, for PCT/US2015/039952, dated Sep. 23, 2015, 8 pages.

Notification of Transmittal of the International Search Report and the Written Opinion of the International Searching Authority, or the Declaration, for PCT/US2015/041161, dated Oct. 7, 2015, 8 pages.

Notification of Transmittal of the International Search Report and the Written Opinion of the International Searching 4uthority, or the Declaration, for PCT/US2015/043463, dated Oct. 16, 2015, 8 pages.

Oh, et al., Pseudo-Differential Vector Signaling for Noise Reduction in Single-Ended Signaling, DesignCon 2009.

Poulton, et al., "Multiwire Differential Signaling", UNC-CH Department of Computer Science Version 1.1, Aug. 6, 2003.

Schneider, J., et al., "ELEC301 Project: Building an Analog Computer," Dec. 19, 1999, 8 pages, http://www.clear.rice.edu/elec301/Projects99/anlgcomp/.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Skliar et al., A Method for the Analysis of Signals: the Square-Wave Method, Mar. 2008, Revista de Matematica: Teoria y Aplicationes, pp. 109-129.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Transactions on Computers, vol. 52, No. 5, May 2003, pp. 558-571.

Tierney, J., et al., "A digital frequency synthesizer," Audio and Electroacoustics, IEEE Transactions, Mar. 1971, pp. 18-57, vol. 19, Issue 1, 1 page Abstract from http://ieeexplore.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Zouhair Ben-Neticha et al, "The streTched-Golay and other codes for high-SNR fnite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

Notification of Transmittal of the International Search Report and The Written Opinion of the International Searching Authority, or the Declaration, dated Feb. 15, 2017, 10 pages.

Notification of Transmittal of the International Search Report and the Written Opinion of the International Searching Authority, or the Declaration., for PCT/US17/14997, dated Apr. 7, 2017.

Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.

Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

\* cited by examiner

Six micro-stripline wires

Two groups of three micro-stripline wires

Three conventional micro-stripline differential pairs

VECTOR SIGNALING CODES FOR DENSELY-ROUTED WIRE GROUPS

CROSS REFERENCE TO RELATED APPLICATIONS

This application claims the benefit of U.S. Provisional Application No. 62/328,721 filed Apr. 28, 2016, entitled "VECTOR SIGNALING CODES FOR DENSELY-ROUTED WIRE GROUPS", reference of which is hereby incorporated in its entirety.

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. Pat. No. 9,100,232, issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi I].

U.S. patent application Ser. No. 14/612,243, filed Feb. 2, 2015, naming Amin Shokrollahi, entitled "Methods and Systems for Reduction of Nearest-Neighbor Crosstalk", hereinafter identified as [Shokrollahi II].

U.S. patent application Ser. No. 14/796,443, filed Jul. 10, 2015, naming Amin Shokrollahi and Roger Ulrich, entitled "Vector Signaling Codes with Increased Signal to Noise Characteristics", hereinafter identified as [Shokrollahi III]

BACKGROUND

In communication systems, information may be transmitted from one physical location to another. Furthermore, it is typically desirable that the transport of this information is reliable, is fast and consumes a minimal amount of resources. One of the most common information transfer media is the serial communications link, which may be based on a single wire circuit relative to ground or other common reference, multiple such circuits relative to ground or other common reference, or multiple circuits used in relation to each other.

In the general case, a serial communications link is used over multiple time periods. In each such a time period, a signal or signals over the link represents, and thus conveys, some amount of information typically measured in bits. Thus, at a high level, a serial communications link connects a transmitter to a receiver and the transmitter transmits a signal or signals each time period, the receiver receives signal or signals approximating those transmitted (as the result of signal degradation over the link, noise, and other distortions.) The information being conveyed by the transmitter is "consumed" by the transmitter, and representative signals are generated. The receiver attempts to determine the conveyed information from the signals it receives. In the absence of overall errors, the receiver can output exactly the bits that were consumed by the transmitter.

The optimum design of a serial communications link often depends on the application for which it is used. In many cases, there are trade-offs between various performance metrics, such as bandwidth (number of bits that can be conveyed per unit time and/or per period), pin efficiency (number of bits or bit equivalents that can be conveyed at one time divided by the number of wires used for that conveyance), power consumption (units of energy consumed by the transmitter, signal logic, receiver, etc. per bit conveyed), SSO resilience and cross-talk resilience, and expected error rate.

An example of a serial communications link is a differential signaling (DS) link. Differential signaling operates by sending a signal on one wire and the opposite of that signal on a paired wire; the signal information is represented by the difference between the wires rather than their absolute values relative to ground or other fixed reference. Differential signaling enhances the recoverability of the original signal at the receiver over single ended signaling (SES), by cancelling crosstalk and other common-mode noise. There are a number of signaling methods that maintain the desirable properties of DS while increasing pin-efficiency over DS. Many of these attempts operate on more than two wires simultaneously, using binary signals on each wire, but mapping information in groups of bits.

Vector signaling is a method of signaling. With vector signaling, pluralities of signals on a plurality of wires are considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors. In the example of eight SES wires, where each component has a degree of freedom allowing it to be either of the two possible coordinates, the number of code words in the collection of code words is 2^8, or 256. As with SES or DS links, output drivers used with a binary vector signaling code need only emit two distinct voltage- or current-levels, corresponding to the two possible coordinate values for each vector element.

With non-binary vector signaling, each component has a coordinate value that is a selection from a set of more than two possible values. A "non-binary vector signaling code" refers to a mapping and/or set of rules to map information bits to non-binary vectors. The corresponding output driver for a non-binary vector signaling code may then be configured to emit multiple voltage- or current-levels corresponding to the selected coordinate values for each vector output. Examples of vector signaling methods are described in [Cronie I].

FIELD OF THE INVENTION

The present embodiments relate to communications systems generally, and in particular to high speed digital communications over sets of multiple wires comprising an interconnecting communications medium.

BRIEF DESCRIPTION

Methods and systems are described for receiving signal elements corresponding to a first group of symbols of a vector signaling codeword over a first densely-routed wire group of a multi-wire bus at a first set of multi-input comparators (MICs), receiving signal elements corresponding to a second group of symbols of the vector signaling codeword over a second densely-routed wire group of the multi-wire bus at a second set of MICs, and receiving signal elements corresponding to the first and the second groups of symbols of the vector signaling codeword at a global MIC.

DETAILED DESCRIPTION

Orthogonal vector signaling is described in [Cronie I]. As presented there, an orthogonal vector signaling code (also known as an Orthogonal Differential Vector Signaling code, or ODVS code) may be obtained via the multiplication $$(0, x_2, \ldots, x_n) * M/a \quad [\text{Eqn. 1}]$$

wherein M is an orthogonal n×n-matrix in which the sum of the columns is zero except at the first position, $x_2, \ldots, x_n$ belong to an alphabet S describing the original modulation of these symbols, and a is a normalization constant which ensures that all the coordinates of the resulting vector are between −1 and +1. For example, in case of binary modulation, the alphabet S may be chosen to be $\{-1,+1\}$. In case of ternary modulation, the alphabet S may be chosen as $\{-1,0,1\}$, in case of quaternary modulation, the alphabet S may be chosen as $\{-3,-1,1,3\}$, and in case of quintary modulation S may be chosen as $\{-2,-1,0,1,2\}$. In general, however, it is not necessary that all the $x_i$ are modulated by the same alphabet S. The vector $(x_2, \ldots, x_n)$ is often denoted by x henceforth and is called the message.

In operation, the matrix M does not need to be orthogonal. It suffices that all its rows are pairwise orthogonal (even if the rows are not of Euclidean norm 1). In the following, we call such matrices s-orthogonal (scaled orthogonal).

Detection of the transmitted signals can be accomplished with the matrix M in the following manner. Each row of M is scaled in such a way as to ensure that the sum of the positive entries in that row is equal to 1. Then the entries of each row of this new matrix D (except for the first) are used as coefficients of a multi-input comparator (MIC) as defined in [Holden I]. For example, if n=6, the values on the 6 wires (possibly after equalization) are denoted by a, b, c, d, e, f and the row is [½, ¼, −½, ¼, −½, 0], then the multi-input comparator would calculate the value $$\frac{a}{2} + \frac{b+d}{4} - \left(\frac{c+e}{2}\right) \quad [\text{Eqn. 2}]$$

and would slice the result to reconstruct the original modulation set S. The set of multi-input comparators defined by matrix D are said to detect the ODVS code defined by M if the collection of comparator outputs unambiguously identifies any message x encoded by M as described above.

Vector signaling codes may be informally identified by the number of bits they encode and the number of wires needed to represent the resulting codewords, thus the "Glasswing" code described in [Shokrollahi I] may also be described as a "5b6w" code. This code has a detection matrix D of:

$$D = \begin{bmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{bmatrix}$$

Individual subchannels detected by D are represented by rows 2-6 of the matrix (row 1, which corresponds to common-mode signaling, is not used), with individual received signal wires being represented by columns 1-6 of the matrix.

Detection of such vector signaling codes by a conventional receiver requires that every element of the codeword be present simultaneously, such that the entire codeword may be evaluated and its data decoded. Variations in the propagation time of individual wires comprising the transmission medium ("skew") may impact this simultaneity, leading to an apparent reduction in the horizontal and vertical "eye opening" of the receive detector (i.e. the time during which all codeword elements are present and capable of being decoded.) In order to minimize these skew effects, especially at high data rates, significant efforts may be made to maintain equal-length and similar-path routing of all signal traces comprising the vector signaling code communications interconnection. However, the difficulty of maintaining such tight routing constraints increases significantly with the number of wires in the group, with groups of three or four wire being significantly easier to route than groups of five or six wires.

Micro-stripline techniques are typically used for such high-speed interconnections, with each "wire" of the interconnection being a controlled-impedance transmission line of fixed width separated by a dielectric layer from a ground plane. Such a micro-stripline may be seen in cross section in FIG. 1, where signal conductors 101, 102, 103, 104, 105, 106 are separated from ground plane 100 by a fixed distance (maintained by a dielectric layer such as a printed circuit board, not shown in this representation), each trace created with a fixed width and a fixed spacing to adjacent traces.

Figure 1:
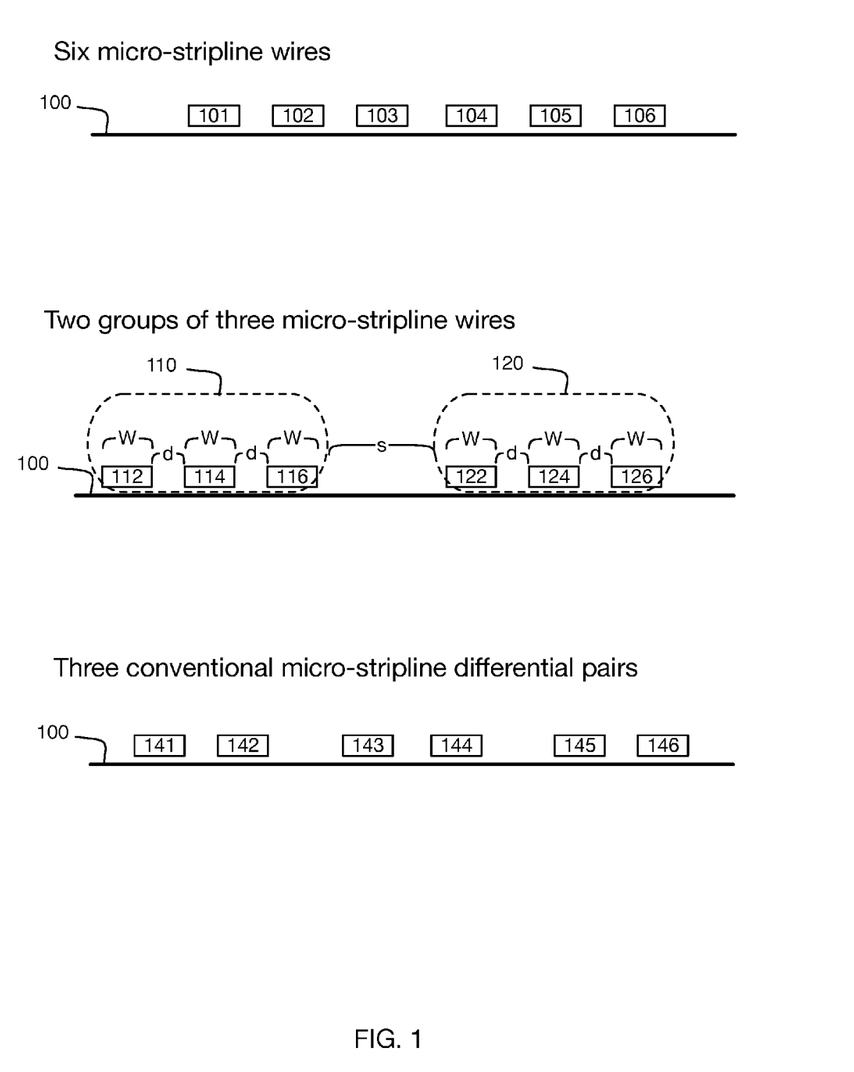
FIG. 1 illustrates multiple printed circuit traces in microstripline configurations, comprising interconnecting communications media.

More generally, these widths and spacings may be represented as shown with conductors 112, 114, 116, 122, 124, 126 having trace width W and inter-trace spacing d. Inter-trace spacing s represents a special case to be described below.

Grouped Trace Routing

It may be noted from matrix D above that the subchannel vectors represented by rows 2 and 3 rely only on wires 1, 2, and 3 to obtain their results. Thus, any skew between any of those wires and wires 4, 5, and 6 will not affect those results. A similar condition applies to subchannel vectors 4 and 5 relying on wires 4, 5, and 6 and being immune to skew on wires 1, 2, and 3. Thus, one embodiment enforces strict three wire routing constraints on the group represented by wires 1, 2, and 3, and strict three wire routing constraints on the group represented by wires 4, 5, and 6, without imposing such strict constraints across the entire set of six wires. These wire groupings are referred to herein as densely-routed wire groups.

Wire coupling effects such as crosstalk on those subchannels may similarly be categorized as occurring between wires of the same densely-routed wire group, or imposed on the group from external sources such as another wire group. Transposing the second and third, and the fifth and sixth wire signals in matrix D produces matrix E, in which these effects are minimized.

$$E = \begin{bmatrix} 1 & 1 & 1 & 1 & 1 & 1 \\ 1 & 0 & -1 & 0 & 0 & 0 \\ 1 & -2 & 1 & 0 & 0 & 0 \\ 0 & 0 & 0 & 1 & 0 & -1 \\ 0 & 0 & 0 & 1 & -2 & 1 \\ 1 & 1 & 1 & -1 & -1 & -1 \end{bmatrix}$$

Crosstalk between wires of the same group is reduced significantly by the described wire grouping and this modified code, because of the relative symmetry of the signaling within each wire group, which tends to balance positive and negative inter-wire capacitive coupling effects. As taught by [Shokrollahi II], this inter-group symmetry also helps to control the total energy emitted by the group that could inductively couple externally, by locally balancing wire current flows within the densely-routed wire group. In particular, in a first group of subchannels consisting of rows 2 and 3 of E, the signaling elements are locally symmetric, or balanced as between the first three wires, such that in the second row the +1 and −1 signal elements are on opposite sides of a center conductor carrying a zero, or middle value. The third row has a local symmetry by having positive values on the outer wires of the grouping of three conductors with a negative value in the middle (or with the reverse polarity of a positive in the middle with negative values on the outer wires). Similarly, this intra-wire group symmetry is repeated for the second group of subchannels (rows 4 and 5 of E) on the second grouping of three conductors forming another densely-routed wire group. In embodiments with more than two groups of densely-routed wire groups, a common mode vector of each group may be seen to form additional subchannels across the groups that display a global inter-group symmetry that is similar to the local intra-group symmetry. That is, in the same way that a subchannel having elements 1, 0, −1 (or elements 1, −2, 1) has a local symmetry within a three-wire group of densely-routed wires, the same type of inter-group symmetry across subgroups is present in a subchannel carried by 9 wires that make up three 3-wire densely-routed groups having elements 1, 1, 1, 0, 0, 0, −1, −1, −1, or a subchannel 1, 1, 1, −2, −2, −2, 1, 1, 1.

To control any residual external crosstalk effects, one embodiment introduces additional isolation spacing between adjacent wire groups, beyond the usual inter-wire spacing. Thus, as shown in FIG. 1, wire groups 110 and 120 are separated by spacing s rather than the spacing w used between wires of the same group. Relative spacings in one particular embodiment are 5 units per wire width W, 5 units for inter-wire spacing d, and 15 units for inter-group spacing s. Thus, a two group six wire microstripline signal path 112, 114, 116, 122, 124, 126 with such spacing will occupy 65 units of total width. By comparison, a legacy six wire three differential pair microstripline signal path laid out with comparable design rules occupies at least 75 units of total width, and can occupy as much as 95 units of width with more typical inter-pair spacing.

Inter-Group Skew Control

The Glasswing subchannel represented by row 6 of matrix D compares the summation of signals on wires 1, 2, 3 with the summation of signals on wires 4, 5, 6, i.e. between the two wire groups. Thus, this subchannel result will be influenced by any skew introduced by wire path differences between the two wire groups. For one representative practical embodiment operating at a 25 Gbps signaling rate (40 picoseconds per signaling unit interval) skew within each three wire group was limited to several picoseconds, while skew between groups could be as much as 10-15 picoseconds.

Conventional skew mitigation teachings suggest that variable delay elements be introduced into each wire signal path, allowing the "fast" wire signals to be delayed until concurrent with the "slow" wire signals. Such variable delay elements are typically implemented as chains of logic gates such as inverters, or as discrete element analog delay lines. Because there is no a priori way of identifying which wire group will be fast or slow, this suggests that a full set of six variable delay elements are used, with significant impact on cost, circuit complexity, and power consumption.

Figure 2:
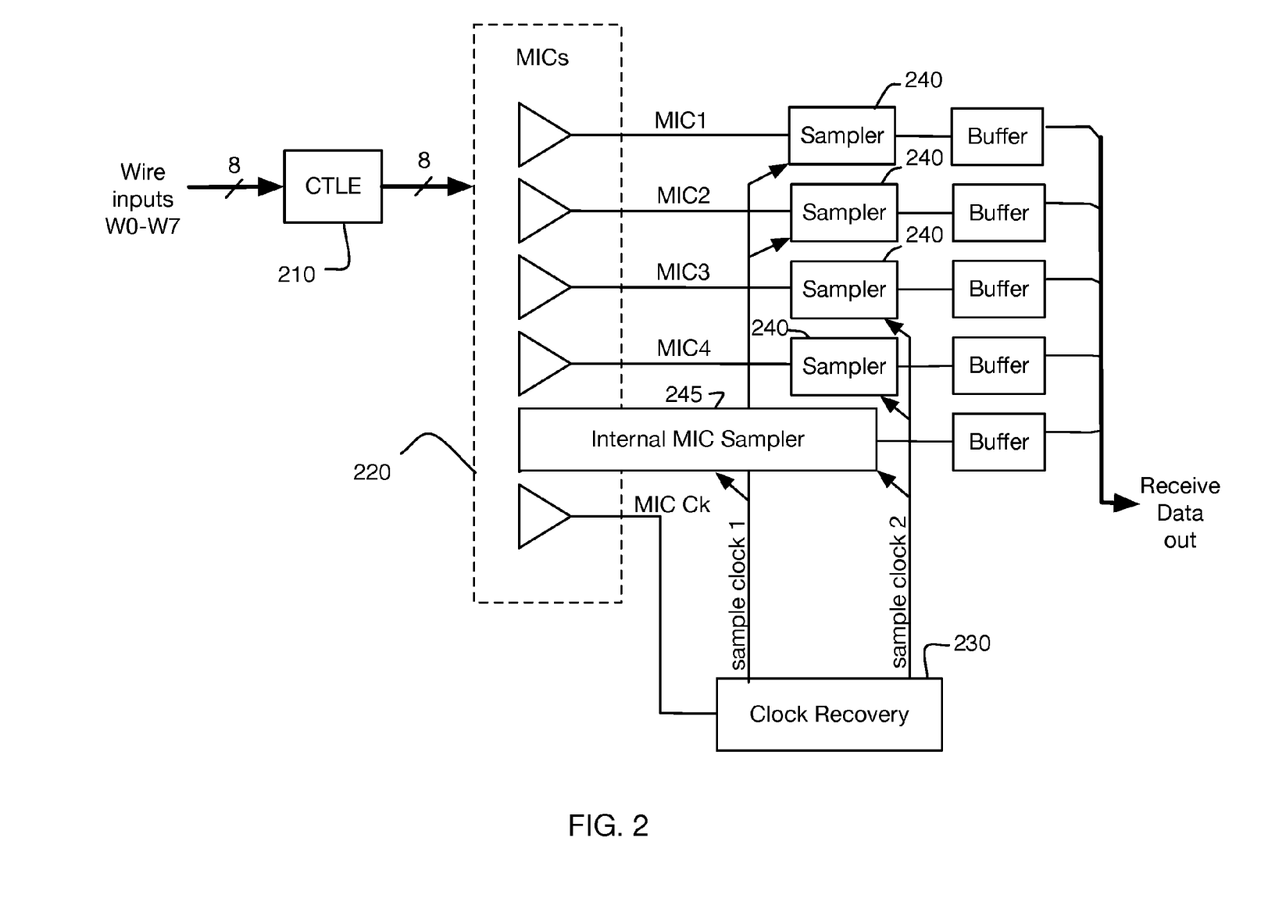
FIG. 2 is a block diagram of one receiver embodiment.

One alternative embodiment delays not the actual wire signals, but instead the sample timing associated with those wire signals. As seen in FIG. 2, a separate clock data alignment system is used to produce a sample timing clock for each densely-routed wire group. In the embodiment of FIG. 2, a clock signal is provided over a differential pair of wires (which, together with a 5b6w system configured as two 3-wire densely-routed groups, brings the total number of wires to 8). In alternative embodiments, a clock signal may be recovered from a MIC output corresponding to a clock-embedded sub-channel through known clock recovery techniques. Further, in some alternative embodiments, a clock signal may be embedded in a subchannel of the orthogonal code, and which may be a subchannel whose elements are carried in a single densely-routed wire group. In these various embodiments, the result of the first set of multi-input comparators configured as the second and third rows of matrix D may be sampled at time t, while the result of the second set of multi-input comparators configured as the fourth and fifth rows of matrix D may be sampled at, as an example, time t+15 picoseconds, if wires 4, 5, and 6 have 15 picoseconds of additional delay beyond that of wires 1, 2, and 3. Internal MIC sampler 245 may be referred to herein as a global MIC, as it is connected to all of the densely-routed wire groups. Alternatively, a global MIC may be a MIC connected to at least two densely-routed wire groups. In the embodiment shown in FIG. 2, it is connected to the first and second densely-routed wire groups.

Sampling of the final detected subchannel, described by the sixth row of matrix D may be more problematic due to skew between the two densely-routed wire groups, wherein the skew is dominated by a difference in the physical lengths of the two wire groups. Further, common mode signals present on the individual densely-routed wire groups may induce differing propagation delays that may further skew the densely-routed wire groups. In particular, a conventional multi-input comparator has only a single sample-able output, which depending on the embodiment either represents a digital comparison result derived from the weighted input terms, or the corresponding analog weighted summation of all input terms. In some embodiments, an apparatus includes a first set of multi-input comparators (MICs) connected to a first densely-routed wire group of a multi-wire bus, the first set of MICs configured to receive signal elements corresponding to a first group of symbols of a vector signaling codeword. In FIG. 2, the first set of MICs may include MIC1 and MIC2, MIC1, and the first densely-routed wire group may include wires W0, W1, and W2. The apparatus may further include a second set of MICs, such as MIC 3 and MIC4, connected to a second densely-routed wire group including wires W3, W4, and W5 of the multi-wire bus, the second set of MICs configured to receive signal elements corresponding to a second group of symbols of the vector signaling codeword. The apparatus may further include a global MIC, shown in FIG. 2 as internal MIC sampler 245, the global MIC connected to the first and second densely-routed wire groups and configured to receive signal elements corresponding to the first and second groups of symbols of the vector signaling codeword.

In some embodiments, the global MIC has a first input connected to all the wires of the first densely-routed wire group and a second input connected to all the wires of the second densely-routed wire group.

In some embodiments, the apparatus further includes a clock recovery circuit 230 for generating a first sampling clock for the first set of MICs and a second sampling clock for the second set of MICs, and wherein the global MIC obtains signal samples based on signal elements received from the first densely-routed wire group according to the first sampling clock, and obtains signal samples of signal elements based on signal elements received from the second densely-routed wire group according to the second sampling clock. In some embodiments, clock recovery circuit 230 obtains a symbol clock received on a differential pair of wires, such as wires W6 and W7 received at MIC ck, which may be a simple two-input differential comparator. Alternatively, the clock recovery circuit may receive a symbol clock from a MIC in the first or second set of MICs or the global MIC.

In some embodiments, the global MIC forms a comparison of a linear combination of the signal samples obtained from the first densely-routed wire group and the signal samples obtained from the second densely-routed wire group, and wherein the global MIC comprises a sampler for receiving a third sampling clock, the third sampling clock having a phase delay with respect to the first and second sampling clocks, the sampler configured to sample the comparison of the linear combination. In some embodiments, the comparison of the linear combination corresponds to a sum of the signal samples received from the first densely-routed wire group compared to a sum of the signal samples received from the second densely-routed wire group.

In some embodiments, the first and second densely-routed wire groups comprise intra-group symmetry with respect to corresponding sub-channel vectors carried by the respective densely-route wire groups. In some embodiments, the first and second densely-routed wire groups are separated by an isolation medium.

In some embodiments, the apparatus may be extended to include a third set of MICs connect to a third densely-routed wire group of the multi-wire bus, the third set of MICs configured to receive signal elements corresponding to a third group of symbols of the vector signaling codeword, and wherein the global MIC is further connected to the third densely-routed wire group and configured to receive signal elements corresponding to the third group of symbols of the vector signaling codeword.

Figure 3:
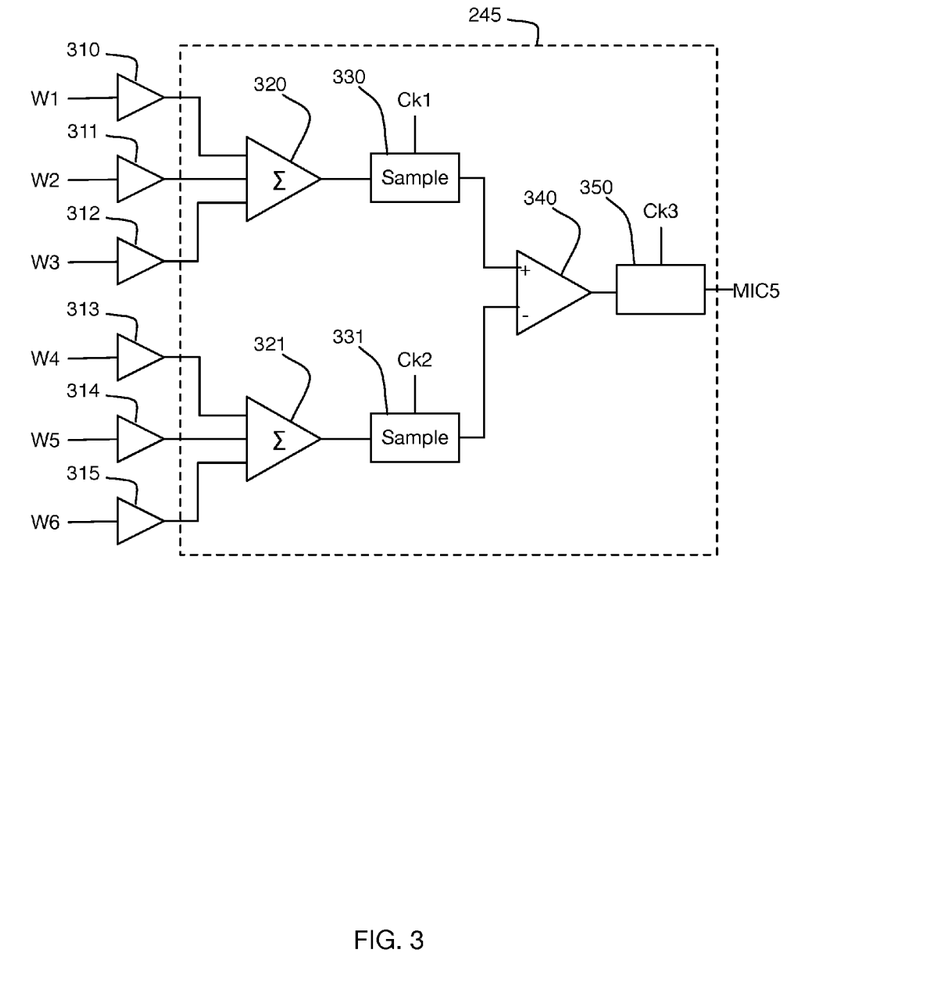
FIG. 3 is a block diagram of one embodiment detecting a subchannel spanning two wire groups.

FIG. 3 is a block diagram showing one alternative embodiment for decoding such a subchannel spanning two input wire groups that may have different timing characteristics. For purposes of illustration and without implying limitation, all elements typically seen in the signal path are shown, although some may be omitted in some embodiments, some may be shared with other receiver subsystems, and some elements may be combined, as in a combination MIC and sampler.

One embodiment of the global MIC shown in FIG. 3 includes two summation nodes 320 and 321, the first producing an analog summation of wires 1, 2, 3, and the second producing an analog summation of wires 4, 5, 6. The analog value of these two results are captured at times $t_1$ and $t_2$ using, as examples offered without limitation, analog sample-and-hold or integrate-and-hold circuits 330 and 331, respectively. The resulting values are then compared at a time $t_3$ equal or later than the later of times $t_1$ and $t_2$ with the comparison result provided as the detected subchannel result.

At the system level, FIG. 2 illustrates times $t_1$ and $t_2$ as being identified by clock signals labeled "sample clock 1" and "sample clock 2" produced by receive clock recovery subsystem 230, those clocks also being associated with optimal sampling times for first wire group subchannels MIC1/MIC2, and second wire group subchannels MIC3/MIC4 respectively.

In FIG. 3, wire signals w1, w2, w3, w4, w5, and w6 are processed by Continuous Time Linear Equalizers (CTLEs) 310, 311, 312, 313, 314, 315 respectively. In some embodiments, the frequency-dependent filtering or amplification provided by CTLE is not used. Summation node 320 produces an analog summation of signals received from wires w1, w2, and w3 (i.e. a first wire group,) which is then sampled 330 using clock CK1 at time $t_1$ associated with the optimum sampling interval for the first wire group. Similarly, summation node 321 produces an analog summation of signals received from wires w4, w5, w6 (i.e. a second wire group,) which is then sampled 331 using clock CK2 at time $t_2$ associated with the optimum sampling interval for the second wire group. The resulting sampled values are presented to multi-input comparator 340, completing detection of the desired subchannel as described in matrix E. In some embodiments, the detected subchannel result is sampled 350 (as one example, using a combined MIC/sampler circuit) using clock CK3 at time $t_3$, which is equal or later than the later of times $t_1$ and $t_2$.

A first alternative embodiment holds only the earlier of the two analog summation signals, performing a clocked comparison between it and the other analog summation signal at the later of the two times.

Figure 4:
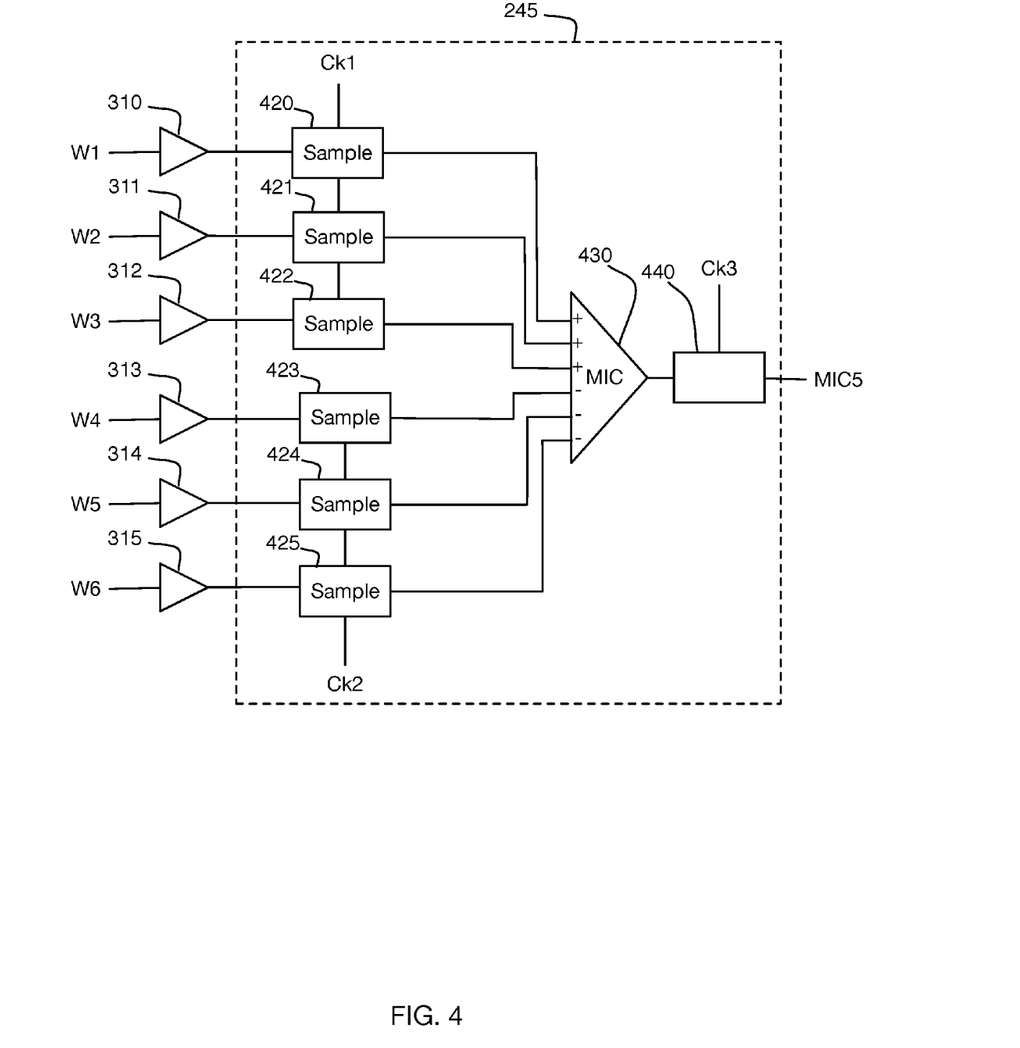
FIG. 4 is a block diagram of another embodiment detecting a subchannel spanning two wire groups.

A second embodiment shown in FIG. 4 retains the conventional six input global MIC used to detect the subchannel corresponding to the sixth row of matrix E, by pre-sampling the wire signal inputs, their analog values being captured at one of times $t_1$ and $t_2$ using, as examples offered without limitation, analog sample-and-hold or integrate-and-hold circuits. The resulting values are then presented to the MIC, with the result available at a time equal or later than the later of times $t_1$ and $t_2$.

In FIG. 4, wire signals w1, w2, w3, w4, w5, and w6 are processed by Continuous Time Linear Equalizers (CTLEs) 310, 311, 312, 313, 314, 315 respectively. In some embodiments, the frequency-dependent filtering or amplification provided by CTLE is not used. The processed signals are then individually sampled 420, 421, 422, 423, 424, 425, with signals associated with a first wire group being sampled at time $t_1$ using clock CK1, and signals associated with a second wire group being sampled at time $t_2$ using clock CK2. The resulting sampled values are presented to multi-input comparator 430, completing detection of the desired subchannel as described in matrix E. In some embodiments, the detected subchannel result is sampled 440 (as one example, using a combined MIC/sampler circuit) using clock CK3 at time $t_3$, which is equal or later than the later of times $t_1$ and $t_2$.

A first alternative embodiment samples or holds only the earlier of the two wire group signals, performing a sampled MIC detection using those signals and the other wire group signals at the later of the two times.

Additional mitigation of the increased skew seen between wire groups may also be obtained by extending the effective detection unit intervals on the relevant subchannels. One embodiment providing such mitigation transmits data on the subchannel corresponding to the sixth row of matrix E at one-half rate, as one example by repeating each data value presented to the encoder for that subchannel. The resulting extended time between transitions at the received MIC output may either be sampled at one half rate, or may be sampled at normal unit intervals with every other sample result being ignored as redundant or occurring during signal transitions.

Figure 5:
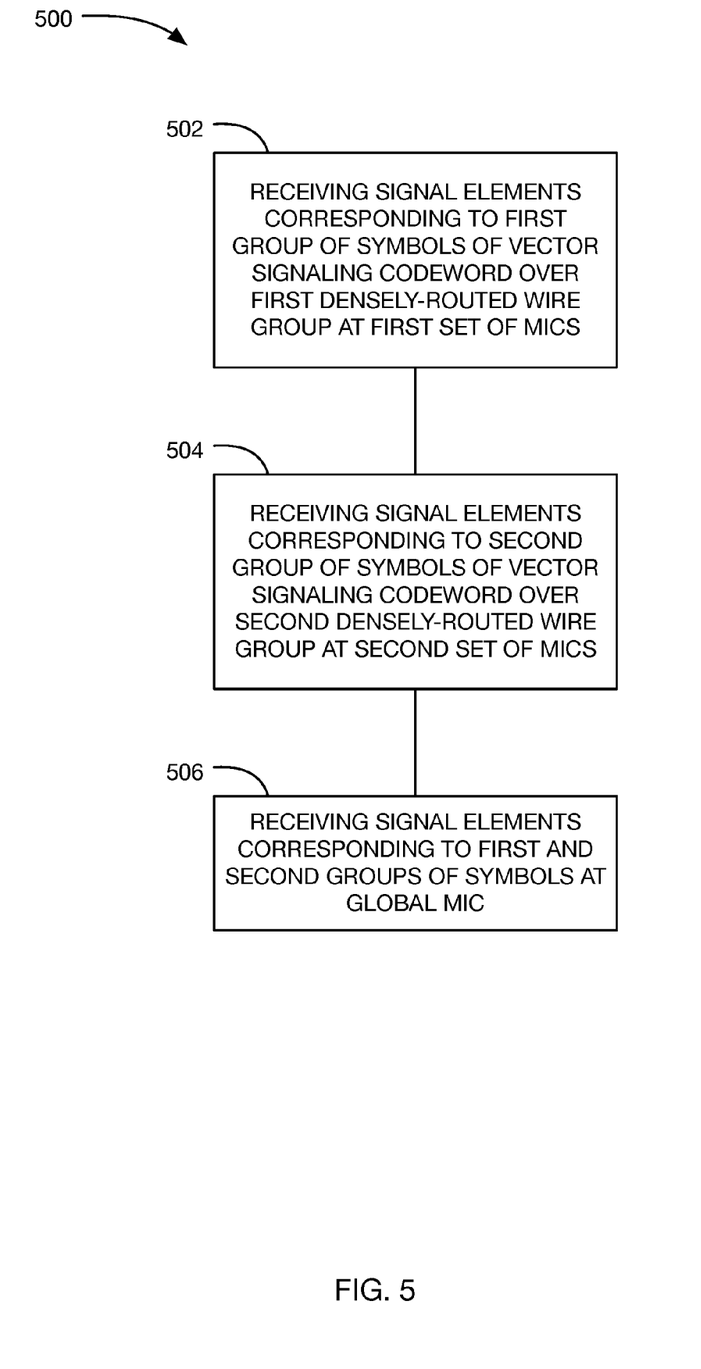
FIG. 5 is a flowchart of a method, in accordance with some embodiments.

FIG. 5 is a flowchart of a method 500, in accordance with some embodiments. As shown, method 500 includes receiving 502 signal elements corresponding to a first group of symbols of a vector signaling codeword over a first densely-routed wire group of a multi-wire bus at a first set of MICs, receiving 504 signal elements corresponding to a second group of symbols of the vector signaling codeword over a second densely-routed wire group of the multi-wire bus at a second set of MICs, and receiving signal elements corresponding to the first and the second groups of symbols of the vector signaling codeword at a global MIC.

In some embodiments, the symbols of the vector signaling code represent a superposition of a plurality of subchannel vectors, each sub-channel vector weighted by a corresponding antipodal weight. In some embodiments, the first group of symbols of the vector signaling codeword correspond to a superposition of a first subset of the plurality of subchannel vectors and wherein the second group of symbols of the vector signaling codeword correspond to a superposition of a second subset of the plurality of subchannel vectors. For example, in the first group of symbols may correspond to symbols received on wires 1, 2, and 3, and the second group of symbols may correspond to symbols received on wires 4, 5, and 6 in accordance with the embodiment described with respect to FIG. 2. The symbols received on wires 1, 2, and 3 are formed using a summation of signal components provided by subchannel vectors corresponding to rows 2, 3, and 6 of matrix D. Similarly, symbols received on wires 4, 5, and 6 are formed using a summation of signal components provided by subchannel vectors corresponding to rows 4, 5, and 6 of matrix D. In such an embodiment, the first and second subsets of the plurality of subchannel vectors share a single subchannel vector corresponding to row 6.

In some embodiments, the signal elements of the first group of subchannel vectors are locally symmetric over the first densely-routed wire group and the signal elements of the second group of subchannel vectors are locally symmetric over the second densely-routed wire group. Such symmetry is illustrated above regarding the permutations of the columns of matrix D to obtain matrix E. As described above, the first densely-routed group of wires 1, 2, and 3 carry a superposition of signal components of subchannel vectors corresponding to rows 2, 3 and 6 of the matrix. By providing subchannel symmetry, the crosstalk associated with each subchannel vector is reduced. The subchannel vector corresponding to row 2 has differential signal components on wires 1 and 3, which reduces crosstalk compared to the signal components being on wires 1 and 2. Similarly, the subchannel vector corresponding to row 3 has signal component values of '1' on wires 1 and 3, with a signal component value of '−2' in the middle on wire 2, further reducing crosstalk. As the signal component values put on wires 1, 2, and 3 from the subchannel vector corresponding to row 6 of the matrix are all equal, there is no change in crosstalk due to the permutation of the columns of the matrix.

In some embodiments, the method further includes generating a first set of sampled outputs of the first set of MICs using a first sampling clock and generating a second set of sampled outputs of the second set of MICs using a second sampling clock, and forming a comparison of (i) a sum of the first set of sampled outputs and (ii) the second set of sampled outputs, and sampling the comparison using a third sampling clock. In some embodiments, the third sampling clock has a delay with respect to the first and second sampling clocks, and may be formed using the first and second sampling clocks, or using another means of generating a sampling clock.

In some embodiments, the first and second densely-routed wire group comprises three conductors. In alternative embodiments, the first densely-routed wire group comprises three conductors and the second densely-routed wire group comprises two conductors. Other densely-routed wire group formats may also be plausible, such as three densely-routed wire groups each having three wires. In such and embodiment having three densely-routed wire groups, the method further includes receiving signal elements corresponding to a third group of symbols of the vector signaling codeword over a third densely-routed wire group of the multi-wire bus at a third set of MICs, and wherein the global MIC is further configured to receive the signal elements corresponding to the third group of symbols of the vector signaling codeword.

Extension to Additional Wire Groups

In some embodiments, the wire arrangements of FIG. 1 may be extended to support additional wiring groups beyond the two groups of the previous example by introducing another inter-group space s and another set of wires of width w and spacing d.

As one familiar with vector signaling codes will observe, the same coding methodologies used for encoding signals on individual wires may be applied to encoding the common mode values of wire groups. Without limitation, these methods include differential signaling between the common mode values of pairs of groups (as in the previous example), differential signaling between the sum of common modes on two groups versus the common mode of another group, differential signaling between the sum of common modes of two groups versus the sum of common modes of two other groups, and extensions of these methods to larger sets of groups.

Normalizing Subchannel Gain

It may be observed that the MICs defined by matrix rows 1, 3, and 5 of matrices D and E produce output values of $\pm 2/3$, whereas the MICs defined by matrix rows 2 and 4 produce output values of $\pm 1$. The loss in vertical eye opening compared to differential signaling is therefore $20*\log 10(3) = \sim 9.5$ dB. This output level variation is the result of our loosened definition of orthogonality for the receive matrix, as the non-unity values of the diagonal $M^TM=D$ represent non-unity gains for the corresponding sub-channels. In some embodiments, normalizing the matrix (i.e. scaling its elements such that the diagonal values are 1), results in a system having constant unity gain across all sub-channels. However, such known normalization methods may lead to suboptimal embodiments as the large number of distinct normalized coefficient values, in many cases including irrational values, are difficult to embody in a practical system.

At least one embodiment retains the un-normalized matrix with its convenient-to-implement coefficient values, and instead compensates for the variation of sub-channel amplitude by modifying the input signal amplitudes modulating the various sub-channel. For example, a hypothetical system having eight sub-channels of unity gain and one sub-channel of 0.8 gain will ultimately be SNR limited by the latter output. Thus, increasing the last sub-channel's transmission input to $\{+1.2, -1.2\}$ rather than $\{+1, -1\}$ will bring up the corresponding channel output. Alternatively, decreasing all other sub-channel inputs to $\{+0.8, -0.8\}$ will lower the corresponding channel outputs, such that all channels have equal output levels and use less transmit power.

This compensation technique is not without cost, however. As taught by [Shokrollahi III], modifying the input vector in this manner leads to an increase in the alphabet size needed (and thus, the number of discrete signal levels the transmitter must generate) to communicate the codewords over the channel. [Shokrollahi III] teaches numeric methods to select suitable modulation amplitudes that result in closer matching of sub-channel outputs with minimal expansion of the alphabet size.

Applying the procedure taught by [Shokrollahi III], the optimal initial code set for Glasswing is calculated to be (0, $\pm 3/8$, $\pm 1/4$, $\pm 3/8$, $\pm 1/4$, $\pm 3/8$) with the corresponding code having an alphabet of size 10 given by (1, 7/8, 1/2, 1/4, 1/8, -1/8, -1/4, -1/2, -7/8, -1). The resulting codewords are shown in Table 1, with the new code herein called the 5b6w_10_5 code.

TABLE 1

| | |
|---|---|
| ± [1, 1/4, -1/8, 1/4, -1/2, -7/8] | ± [1, 1/4, -1/8, -1/4, -1, 1/8] |
| ± [1/4, 1, -1/8, 1/4, -1/2, -7/8] | ± [1/4, 1, -1/8, -1/4, -1, 1/8] |
| ± [1/2, -1/4, 7/8, 1/4, -1/2, -7/8] | ± [1/2, -1/4, 7/8, -1/4, -1, 1/8] |
| ± [-1/4, 1/2, 7/8, 1/4, -1/2, -7/8] | ± [-1/4, 1/2, 7/8, -1/4, -1, 1/8] |
| ± [1, 1/4, -1/8, -1/2, 1/4, -7/8] | ± [1, 1/4, -1/8, -1, -1/4, 1/8] |
| ± [1/4, 1, -1/8, -1/2, 1/4, -7/8] | ± [1/4, 1, -1/8, -1, -1/4, 1/8] |
| ± [1/2, -1/4, 7/8, -1/2, 1/4, -7/8] | ± [1/2, -1/4, 7/8, -1, -1/4, 1/8] |
| ± [-1/4, 1/2, 7/8, -1/2, 1/4, -7/8] | ± [-1/4, 1/2, 7/8, -1, -1/4, 1/8] |

With this code, all MICs as defined by matrix E produce output values of $\pm 3/4$. The increase in vertical eye opening compared to the unmodified 5b6w code is $20*\log 10((3/4)/(2/3)) = \sim 1$ dB. The termination power of 5b6w_10_5 is about 88% of the termination power of the unmodified 5b6w code, so even at a smaller termination power, 5b6w_10_5 leads to a fractionally improved vertical eye opening. However, the implementation cost to obtain this improvement is the added complexity within the transmitter to encode data into an internal representation capable of selecting among ten rather than four symbol values per wire, and line drivers capable of generating ten discrete output levels rather than four. Such a transmitter embodiment would be fully compatible with any Glasswing receiver defined by matrix E, and would use less line driver power than an unmodified 5b6w transmit driver. Because of this generally disadvantageous cost/benefit tradeoff, most embodiments of Glasswing transmitters are expected to utilize unmodified 5b6w signal levels; where they are cost-effective, alternative embodiments incorporating the 5b6w_10_5 modifications may transparently be interchanged and/or interoperate with unmodified ones.

Addressing Transistor Mismatch

Especially with very small integrated circuit feature sizes, there can be considerable mismatch between "identical" transistors in a circuit design. As examples, consider two MIC designs as taught by [Holden I] for detection of the second and third rows of matrix E. The MIC detecting the second row utilizes a differential comparator input having one transistor on each input leg, making it more susceptible to process variations between those transistors, while the MIC detecting the third row has two transistors on each input leg, reducing its susceptibility to process variations.

One embodiment addresses such susceptibilities by increasing the number of transistors per differential input leg by, as one example, paralleling two or more transistors per input signal rather than utilizing a single transistor. This paralleling may be seen in matrix F, $$F = \begin{bmatrix} 1 & 1 & 1 & 1 & 1 & 1 \\ 3 & 0 & -3 & 0 & 0 & 0 \\ 2 & -4 & 2 & 0 & 0 & 0 \\ 0 & 0 & 0 & 3 & 0 & -3 \\ 0 & 0 & 0 & 2 & -4 & 2 \\ 1 & 1 & 1 & -1 & -1 & -1 \end{bmatrix}$$

which differs from matrix E in that its second and fourth rows have been multiplied by three, and its third and fifth rows have been multiplied by two. Thus, a MIC embodying the second row of matrix F would utilize three paralleled transistors per differential input leg where a MIC embodying the second row of matrix E would use a single transistor per differential input leg.

EMBODIMENTS

Following are some embodiments that incorporate various aspects of the signaling and associated wire groupings described above. The term "normal matrix" is used to refer to matrices with integer values for ease of understanding, with the normalization factor specified separately. The term "symmetric-eye matrix" specifies the matrix variation that provides equal eye openings at the output of the receive comparators/amplifiers.

2b3w:

Normal Matrix:

$$\begin{bmatrix} 1 & 0 & -1 \\ 1 & -2 & 1 \end{bmatrix}$$

Normalization factor=2. The alphabet is $\{1,0,-1\}$. Eye openings are $\pm 1$, $\pm 3/2$.

Symmetric-Eye Matrix:

$$\begin{bmatrix} 3 & 0 & -3 \\ 2 & -4 & 2 \end{bmatrix}$$

Normalization factor=5. The alphabet is {1, ⅘, ⅕, −⅕, −⅘, −1}. All eye openings are ±⅖. Routing can be done by having tight skew match across wires 1 and 3, and less skew match on the middle wire.

4b5w:

Normal Matrix:

$$\begin{bmatrix} 1 & 0 & -1 & 0 & 0 \\ 1 & -2 & 1 & 0 & 0 \\ 0 & 0 & 0 & 1 & -1 \\ 2 & 2 & 2 & -3 & -3 \end{bmatrix}$$

Normalization factor=4. The alphabet in this case is {1, ⅓, 0, −⅓, −1}. Eye openings are ±½, ±¾, ±½, ±¾.

Symmetric-Eye Matrix:

$$\begin{bmatrix} 15 & 0 & -15 & 0 & 0 \\ 10 & -20 & 10 & 0 & 0 \\ 0 & 0 & 0 & 15 & -15 \\ 12 & 12 & 12 & -18 & -18 \end{bmatrix}$$

Normalization factor=37 to provide values between ±1. The alphabet size is 16, and the alphabet is [−37, −33, −32, −17, −13, −8, −7, −3, 3, 7, 8, 13, 17, 32, 33, 37]/37. All eye openings are 30/37~0.81.

Routing is in a dense group of 3 wires and a dense group of 2 wires: spacing of w-space-w-space-w 3×space w-space-w where space is 5 units, and w is 5 units. Skew between the group of 3 and group of 2 can be handled similarly to what is described for GW and skew between two groups of 3 wires.

8b9w:

Normal Matrix:

$$\begin{bmatrix} 1 & 0 & -1 & 0 & 0 & 0 & 0 & 0 & 0 \\ 1 & -2 & 1 & 0 & 0 & 0 & 0 & 0 & 0 \\ 0 & 0 & 0 & 1 & 0 & -1 & 0 & 0 & 0 \\ 0 & 0 & 0 & 1 & -2 & 1 & 0 & 0 & 0 \\ 0 & 0 & 0 & 0 & 0 & 0 & 1 & 0 & -1 \\ 0 & 0 & 0 & 0 & 0 & 0 & 1 & -2 & 1 \\ 1 & 1 & 1 & -2 & -2 & -2 & 1 & 1 & 1 \\ 1 & 1 & 1 & 0 & 0 & 0 & -1 & -1 & -1 \end{bmatrix}$$

Normalization factor=4. The alphabet in this case is {1, ½, 0, −½, −1]. Eye openings are ±½, ±¾, ±½, ±¾, ±½. ±½, ±¾.

Symmetric-Eye Matrix:

$$\begin{bmatrix} 3 & 0 & -3 & 0 & 0 & 0 & 0 & 0 & 0 \\ 2 & -4 & 2 & 0 & 0 & 0 & 0 & 0 & 0 \\ 0 & 0 & 0 & 3 & 0 & -3 & 0 & 0 & 0 \\ 0 & 0 & 0 & 2 & -4 & 2 & 0 & 0 & 0 \\ 0 & 0 & 0 & 0 & 0 & 0 & 3 & 0 & -3 \\ 0 & 0 & 0 & 0 & 0 & 0 & 2 & -4 & 2 \\ 2 & 2 & 2 & -4 & -4 & -4 & 2 & 2 & 2 \\ 3 & 3 & 3 & 0 & 0 & 0 & -3 & -3 & -3 \end{bmatrix}$$

Normalization factor=10. The alphabet in this case is of size 21 and equals [−10, −9, −8, −6, −5, −4, −3, −2, −1, 0, 1, 2, 3, 4, 5, 6, 8, 9, 10]/10. The eye openings are ±⅗.

Routing can be done in groups of three wires, distance 5 between wires in each group, distance 15 between groups. The two outer three wire groups have closer matching between groups than matching with the middle group of three wires.

Example signal levels, signal frequencies, and physical dimensions described herein are provided for purposes of explanation, and are not limiting. Different vector signaling codes may be used, communicated using more or fewer wires per group, fewer or greater numbers of signal levels per wire, and/or with different code word constraints. For convenience, signal levels are described herein as voltages, rather than their equivalent current values.

Other embodiments may utilize different signaling levels, connection topology, termination methods, and/or other physical interfaces, including optical, inductive, capacitive, or electrical interconnection. Similarly, examples based on unidirectional communication from transmitter to receiver are presented for clarity of description; combined transmitter-receiver embodiments and bidirectional communication embodiments are also explicitly in accordance with some embodiments.

The examples presented herein illustrate the use of vector signaling codes carried by parallel transmission line interconnections for intra-chip and chip-to-chip communication. However, those exemplary details should not be seen as limiting the scope of the described embodiments. The methods disclosed in this application are equally applicable to other interconnection topologies and other communication media including optical, capacitive, inductive, and wireless communications which may rely on any of the characteristics of the described embodiments, including but not limited to communications protocol, signaling methods, and physical interface characteristics. Thus, descriptive terms such as "voltage" or "signal level" should be considered to include equivalents in other measurement systems, such as "current", "optical intensity", "RF modulation", etc. As used herein, the term "signal" includes any suitable behavior and/or attribute of a physical phenomenon capable of conveying information. The information conveyed by such signals may be tangible and non-transitory.

The invention claimed is:

1. A method comprising:

receiving signal elements corresponding to a first group of symbols of a vector signaling codeword over a first densely-routed wire group of a multi-wire bus at a first set of multi-input comparators (MICs) for detecting a first set of subchannel vectors of a plurality of mutually orthogonal subchannel vectors, the first set of subchannel vectors being carried exclusively via the first densely-route wire group, and responsively generating a respective detected subchannel output for each subchannel vector in the first set of subchannel vectors;

receiving signal elements corresponding to a second group of symbols of the vector signaling codeword over a second densely-routed wire group of the multi-wire bus at a second set of MICs for detecting a second set of subchannel vectors of the plurality of mutually orthogonal subchannel vectors, the second set of subchannel vectors being carried exclusively via the second densely-routed wire group, and responsively generating a respective detected subchannel output for each subchannel vector in the second set of subchannel vectors; and processing, at a global MIC, (i) signal elements received via the first densely-routed wire group according to a first sampling clock and (ii) signal elements received via the second densely-routed wire group according to a second sampling clock, the second sampling clock having an offset with respect to the first sampling clock, the offset associated with a skew difference between the first and second densely-routed wire groups, the signal elements processed at the global MIC for detecting a subchannel vector of the plurality of mutually orthogonal subchannel vectors being carried by the first and second densely-routed wire groups.

2. The method of claim 1, wherein the symbols of the vector signaling code represent a superposition of the plurality of mutually orthogonal subchannel vectors, each mutually orthogonal subchannel sub-channel vector weighted by a corresponding antipodal weight.

3. The method of claim 1 wherein each subchannel vector of the first set of subchannel vectors is locally symmetric over the first densely-routed wire group and wherein each subchannel vector of the second set of subchannel vectors is locally symmetric over the second densely-routed wire group.

4. The method of claim 1 wherein the first and second densely-routed wire group each comprise a respective set of three conductors.

5. The method of claim 1 wherein the first densely-routed wire group comprises three conductors and the second densely-routed wire group comprises two conductors.

6. The method of claim 1, further comprising receiving signal elements corresponding to a third group of symbols of the vector signaling codeword over a third densely-routed wire group of the multi-wire bus at a third set of MICs, and wherein the global MIC is further configured to receive the signal elements corresponding to the third group of symbols of the vector signaling codeword.

7. The method of claim 6, wherein the first, second, and third densely-routed wire groups each comprise three conductors.

8. The method of claim 1, wherein the skew difference is based at least in part on an asymmetrical layout of the first and second densely-routed wire groups.

9. The method of claim 1, wherein the skew difference is based at least in part on a propagation delay difference associated with differing common mode signals on the first and second densely-routed wire groups.

10. An apparatus comprising:
a first set of multi-input comparators (MICs) connected to a first densely-routed wire group of a multi-wire bus, the first set of MICs configured to receive signal elements corresponding to a first group of symbols of a vector signaling codeword and to responsively generate a respective detected subchannel output for each subchannel vector in a first set of subchannel vectors of a plurality of mutually orthogonal subchannel vectors, the first set of subchannel vectors being carried exclusively via the first densely-route wire group;

a second set of MICs connected to a second densely-routed wire group of the multi-wire bus, the second set of MICs configured to receive signal elements corresponding to a second group of symbols of the vector signaling codeword and to responsively generate a respective detected subchannel output for each subchannel vector in a second set of subchannel vectors of the plurality of mutually orthogonal subchannel vectors, the second set of subchannel vectors being carried exclusively via the second densely-route wire group; and a global MIC connected to the first and second densely-routed wire groups configured to detect a subchannel vector of the plurality of mutually orthogonal subchannel vectors being carried by the first and second densely-routed wire groups by processing (i) signal elements received via the first densely-routed wire group according to a first sampling clock and (ii) signal elements received via the second densely-routed wire group according to a second sampling clock, the second sampling clock having an offset with respect to the first sampling clock, the offset associated with a skew difference between the first and second densely-routed wire groups.

11. The apparatus of claim 10, wherein the global MIC has a first input connected to all the wires of the first densely-routed wire group and a second input connected to all the wires of the second densely-routed wire group.

12. The apparatus of claim 10, further comprising a clock recovery circuit configured to generate the first sampling clock for the first set of MICs and the second sampling clock for the second set of MICs.

13. The apparatus of claim 12, wherein the clock recovery circuit is configured to obtain a symbol clock received on a differential pair of wires.

14. The apparatus of claim 12, wherein the clock recovery circuit is configured to receive a symbol clock from a MIC in the first or second set of MICs or the global MIC.

15. The apparatus of claim 10, wherein the global MIC is configured to process the signal elements received via the first densely-routed wire group and the signal elements received via the second densely-routed wire group by forming respective sums of the signal elements received via the first densely-routed wire group and of the signal elements received via the second densely-routed wire group, and to detect the subchannel vector by comparing the respective sums.

16. The apparatus of claim 10, wherein the first and second densely-routed wire groups comprise intra-group symmetry with respect to subchannel vectors within the first and second sets of subchannel vectors, respectively.

17. The apparatus of claim 10, further comprising an isolation medium separating the first and second densely-routed wire groups.

18. The apparatus of claim 10, further comprising a third set of MICs connect to a third densely-routed wire group of the multi-wire bus, the third set of MICs configured to receive signal elements corresponding to a third group of symbols of the vector signaling codeword, and wherein the global MIC is further connected to the third densely-routed wire group and configured to receive signal elements corresponding to the third group of symbols of the vector signaling codeword.

19. The apparatus of claim 10, wherein the skew difference corresponds to asymmetric layout of the first and second densely-routed wire groups.

20. The apparatus of claim 10, wherein the skew difference is based at least in part on a propagation delay difference associated with differing common mode signals on the first and second densely-routed wire groups.

* * * * *